United States Patent
Faber et al.

(10) Patent No.: US 10,486,273 B2
(45) Date of Patent: Nov. 26, 2019

(54) SPINDLE FOR A BALL SCREW AND METHOD FOR PRODUCING SAME

(71) Applicant: Schaeffler Technologies AG & Co. KG, Herzogenaurach (DE)

(72) Inventors: Daniel Faber, Burgthann (DE); Benjamin Wubbolt-Gorbatenko, Herzogenaurach (DE); Matthias Dohr, Herzogenaurach (DE); Fritz Kammerer, Neuhof-Zenn (DE)

(73) Assignee: SCHAEFFLER TECHNOLOGIES AG & CO. KG, Herzogenaurach (DE)

( * ) Notice: Subject to any disclaimer, the term of this patent is extended or adjusted under 35 U.S.C. 154(b) by 200 days.

(21) Appl. No.: 15/510,036

(22) PCT Filed: Sep. 3, 2015

(86) PCT No.: PCT/DE2015/200450
§ 371 (c)(1),
(2) Date: Mar. 9, 2017

(87) PCT Pub. No.: WO2016/041555
PCT Pub. Date: Mar. 24, 2016

(65) Prior Publication Data
US 2018/0126500 A1 May 10, 2018

(30) Foreign Application Priority Data
Sep. 15, 2014 (DE) .......................... 10 2014 218 405

(51) Int. Cl.
*F16H 25/24* (2006.01)
*B23P 15/00* (2006.01)
(Continued)

(52) U.S. Cl.
CPC ........ *B23P 15/003* (2013.01); *F16H 25/2204* (2013.01); *F16H 25/24* (2013.01);
(Continued)

(58) Field of Classification Search
CPC ....... B23P 15/003; B21D 53/10; B21D 53/24; B21D 5/12; B21D 13/04; F16H 25/2204;
(Continued)

(56) References Cited

U.S. PATENT DOCUMENTS

| 4,844,280 A | * | 7/1989 | Purdy | ...................... A45C 5/02 220/646 |
| 8,220,353 B2 | | 7/2012 | Teramachi et al. | |

(Continued)

FOREIGN PATENT DOCUMENTS

| CN | 101248300 | 8/2008 |
| CN | 2446332 | 9/2011 |

(Continued)

*Primary Examiner* — Bayan Salone
(74) *Attorney, Agent, or Firm* — Volpe and Koenig, P.C.

(57) ABSTRACT

The invention relates to a method for producing a spindle for a ball screw, including the following steps: —introducing, at least in sections, a thread profile into a flat material section, —shaping the material section to a hollow cylindrical case, two lateral edges of the hollow cylindrical case abutting each other and the thread profile being oriented radially outwards, —connecting the two lateral edges of the hollow cylindrical case, and —forming, at least in sections, a supporting structure on a radially inner face of the hollow cylindrical case to finish the spindle. A spindle for a ball screw in hybrid design can thus be manufactured in a simple manner. The spindle can be produced cost-effectively and yet has high wear resistance and excellent mechanical load-bearing capacity as well as light weight. The invention further relates to a spindle manufactured according to the invention, for use in a ball screw.

18 Claims, 4 Drawing Sheets

(51) Int. Cl.
  *B21D 5/12*    (2006.01)
  *B21D 13/04*   (2006.01)
  *B21D 53/10*   (2006.01)
  *B21D 53/24*   (2006.01)
  *F16H 25/22*   (2006.01)

(52) U.S. Cl.
  CPC ............... *B21D 5/12* (2013.01); *B21D 13/04* (2013.01); *B21D 53/10* (2013.01); *B21D 53/24* (2013.01); *F16H 2025/2481* (2013.01)

(58) Field of Classification Search
  CPC ............. F16H 25/24; F16H 2025/2481; Y10T 29/49883
  USPC ............... 72/67, 80, 88; 137/315.4; 409/234
  See application file for complete search history.

(56) References Cited

U.S. PATENT DOCUMENTS

| | | | | |
|---|---|---|---|---|
| 2002/0195836 A1* | 12/2002 | Gehringhoff | ......... | B60J 5/0444 296/187.12 |
| 2010/0101348 A1* | 4/2010 | Teramachi | ......... | F16H 25/2223 74/424.81 |
| 2014/0326090 A1* | 11/2014 | Kisa | ....... | B21D 15/04 74/89.23 |

FOREIGN PATENT DOCUMENTS

| | | | | |
|---|---|---|---|---|
| DE | 4131486 | 3/1993 | | |
| DE | 10028968 | 12/2001 | | |
| DE | 102011081966 | 3/2013 | | |
| DE | 102011081966 A1 * | 3/2013 | ............ | B21D 15/04 |
| EP | 1914447 | 4/2008 | | |
| JP | 2004346987 | 12/2004 | | |

\* cited by examiner

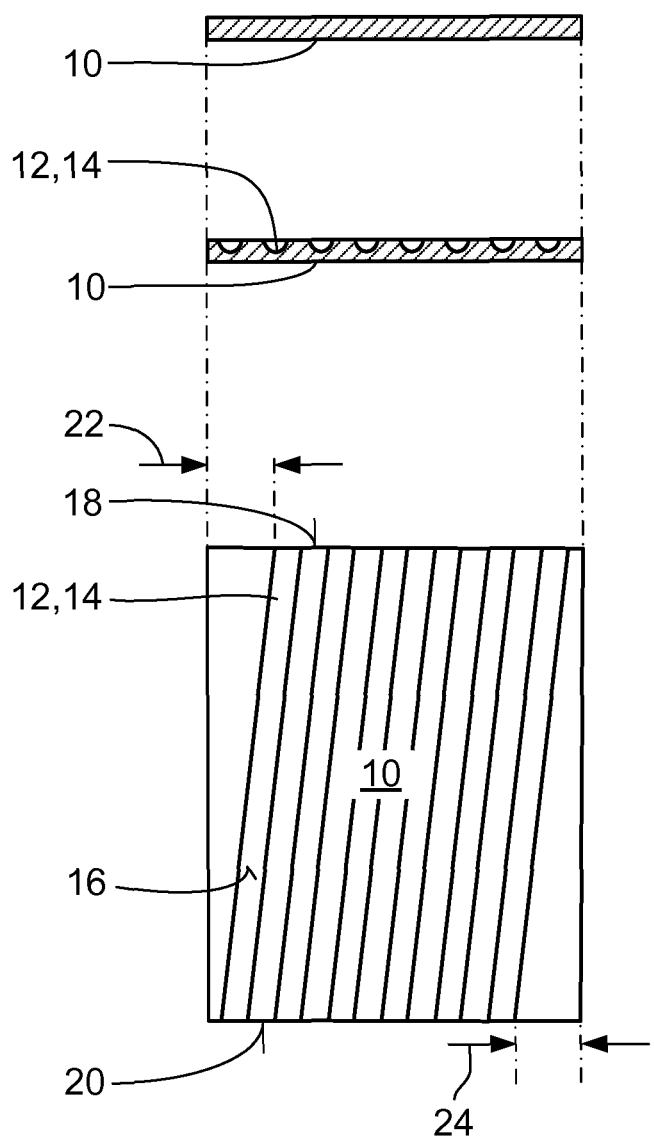

SPINDLE FOR A BALL SCREW AND METHOD FOR PRODUCING SAME

BACKGROUND

The invention relates to a spindle for a ball screw and a method for producing this spindle.

For example, ball screws are widely used in automotive technology, primarily as actuators, because they enable a low-loss conversion of a rotational motion into a linear motion and vice versa. Such a ball screw comprises essentially a spindle and a nut or sleeve surrounding this spindle coaxially, between which ball-shaped roller bodies are arranged. Producing these components that are required for a ball screw from a solid material by means of cutting methods is challenging and therefore cost-intensive.

From the prior art, different methods and constructions of ball screws are known that permit relatively simple and therefore economical production of these ball screws. From DE 100 28 968 A1, such a sleeve is known for a screw drive that is formed from a sheet-metal blank that is flat at the beginning and in which a threaded profile is formed on one side and that is ultimately bent into a longitudinally slotted, hollow cylindrical sleeve, such that the threaded profile forms an internal thread on the sleeve. Roller bodies of the screw drive roll on the internal thread of the sleeve and an external thread on a threaded spindle, wherein a rotational motion is converted into a translational motion. During the production process of the sleeve, however, a longitudinal slot is produced in the sleeve, which can be completely closed only by pressing the sleeve into a hole provided with a corresponding fit. One disadvantage is that the rolling bodies of the screw drive cannot roll without reactions in the area of this longitudinal slot.

From DE 10 2011 081 966 A1, a method for producing a threaded part as a composite part, a roller screw drive, a linear actuator, and an electromechanical brake booster with such a composite part are known. The threaded part is formed as a composite part consisting of a thread turn and a tubular support part, wherein the thread turn is produced by a shaping process.

The tubular support part is preferably produced by a molding process, for example, injection molding or die casting, and simultaneously connected during this process with the thread turn using a material-bonding or positive-locking fit. Preferably, the support part is produced by die casting from a metal or injection molding from a plastic. According to one embodiment presented in that document, the threaded part is formed by a spiral-shaped or helical, wound sheet-metal strip with a flat, rectangular cross section, wherein a flat, channel-like recess is pressed in the sheet-metal strip as a thread turn. The windings of the sheet-metal strip are connected to each other, for example, by spot welding, by axial welding seams, or by a helical welding seam along the abutting longitudinal edges of the sheet-metal strip to form the threaded part that is then connected to the plastic support part by an injection molding process. This is disadvantageous in that, among other things, at least one weld seam to be realized with high accuracy is required to be created that also has a large longitudinal extent.

SUMMARY

The invention is based on the objective of providing a simplified method for producing a spindle for a ball screw. A spindle for a ball screw is also to be provided that functions without an additional, radially outer enclosing structure.

The invention starts from the knowledge that the production of hollow cylindrical sheet-metal shaped parts can be simplified by rolling a flat material blank, which minimizes, among other things, a seam length of the edges of the rolled material blanks to be connected.

The invention will first describe a method for producing a spindle for a ball screw. The objective mentioned above is achieved by a method that has the following steps:

Forming a thread profile in a flat material section in at least some areas,

Shaping the material section into a hollow cylindrical sleeve, wherein two longitudinal edges of the hollow cylindrical sleeve abut each other and the threaded profile is directed radially outward, Connecting the two longitudinal edges of the hollow cylindrical sleeve, and Forming a support structure on the radial inner side of the hollow cylindrical sleeve at least in some areas for completing the spindle.

By the use of this method, a spindle with an external thread for a ball screw can be produced very economically. By connecting the hollow cylindrical sleeve along its two straight longitudinal edges abutting each other after the shaping process, a required connection seam length is significantly reduced in comparison to a sheet-metal strip would, for example, helically into a tube and connected along the edge sides. In addition, the method according to the invention is especially suitable for continuous production. Furthermore, the method enables the production of spindles with different diameters and/or thread profiles in a very advantageous way.

According to one refinement of this method it is provided that the material section is a sheet-metal section with low material thickness. Through the use of metallic sheets for the material section, a high mechanical load capacity and durability of the spindle produced according to the method can be achieved. Preferably, the sheet metal section is cut from a web-shaped sheet-metal semifinished product. In this way, among other things, a continuous production process is possible for producing spindles formed according to the invention. The threaded profile can be formed either before the cutting of the material section continuously from an endless web-shaped semifinished product or after the cutting of the material section into the separated material sections.

According to another favorable construction of the method, it is provided that the thread profile is formed as a round thread with at least one thread turn for holding ball-shaped roller bodies of a ball screw. In this way, the ball-shaped roller bodies typically used in ball screws are guided without a problem in the thread profile and roll in this profile.

In another refinement of the method, it is provided that the connection of the two longitudinal edges of the hollow cylindrical sleeve is realized by joining in at least some sections while creating a longitudinal seam. This produces a reliable mechanical connection of the longitudinal edges of the hollow cylindrical sleeve that abut each other after the molding process, wherein the longitudinal edges abut each other with no gaps and reliably prevent expansion of the hollow cylindrical sleeve of the spindle over its entire longitudinal extent.

According to another continuation of the method, the longitudinal seam is subjected to a surface treatment, for example, grinding, polishing, or honing. This realizes smooth running of a ball screw equipped with the spindle produced according to the method, because the roller bodies of the ball screw can also roll over the longitudinal seam with practically no reaction.

According to another embodiment, the connection of the two longitudinal edges of the hollow cylindrical sleeve of the spindle is realized by pressing a ring on each of the two axial end sections of the hollow cylindrical sleeve. This eliminates the otherwise necessary weld seam to be formed in at least some sections for joining the longitudinal edges of the hollow cylindrical sleeve that abut each other after the shaping process. The weld seam eliminated in this method alternative leads to significant simplifications in terms of processing, because weld seams are technically difficult to produce on thin sheet-metal parts and many times can be produced only in the course of a complicated laser welding process. In addition, a hardening process of the hollow cylindrical sleeve necessary under some circumstances no longer must be realized after connecting the longitudinal edges, because the hardening can no longer be negatively affected by a thermal joining process. Geometrical changes occurring due to the hardening process can also be compensated more easily and deformation due to the thermal joining is avoided.

According to another advantageous construction of the method, the axial end sections of the hollow cylindrical sleeve has a non-profiled construction. This produces a particularly more secure, ideally full-area seating of each ring on one of the two axial end sections of the hollow cylindrical sleeve. Alternatively, the rings can also be shrunk, e.g., thermally onto the profile-free axial end sections of the hollow cylindrical sleeve.

Another favorable construction of the method provides that the support structure is formed, from a plastic material, in particular, during the injection molding. The plastic introduced into the hollow cylindrical sleeve preferably during the injection molding process produces a mechanically close-fitting connection, in particular, a material-bonding and positive-locking connection between the radially inner support structure and the hollow cylindrical sleeve coaxially surrounding the inner support structure with its outer thread profile. Here, the support structure primarily increases the bending stiffness of the final spindle, while the hollow cylindrical sleeve formed from the metal sheet primarily absorbs the point loads caused by the ball-shaped roller bodies rolling in the thread profile and distributes these loads over a larger area before they are introduced into the support structure. Due to hybrid construction produced in this way, a relatively high mechanical load capacity and wear resistance of the spindle produced according to the invention is achieved in connection with a low weight and simultaneously low production costs. Alternatively, the support structure can also be formed from a metallic material, for example, a sintered metal, a metal foam, or a metal injected into the hollow cylindrical sleeve.

According to another refinement, the support structure has a circular ring-shaped cross-sectional geometry that is formed in the production method concentric to the hollow cylindrical sleeve. Due to the preferably tubular construction of the support structure in the interior of the hollow cylindrical sleeve, a high mechanical stiffness of the spindle formed in this way is produced, as well as a significantly reduced weight in comparison to a completely filled hollow cylindrical sleeve.

The subject matter of the invention is also a spindle for a ball screw. Here it is provided that the spindle has a hollow cylindrical sleeve with a radially outside thread profile and that a support structure is formed on the radial inside of the hollow cylindrical sleeve. This makes a simple, continuous, and cost-optimized production of the spindle possible, which provides excellent wear resistance with relatively low weight, and thus is suitable for use in automotive technology.

BRIEF DESCRIPTION OF THE DRAWINGS

For better understanding of the invention, a drawing accompanies the description. Components with identical construction have the same reference symbols. Shown in the drawing are:

FIGS. 1 to 6 an illustration of the sequence of a first method variant for producing a first embodiment of a spindle for a ball screw according to the invention, and FIGS. 7 to 9 a simplified illustration of a second method variant for producing a second embodiment of a spindle for a ball screw according to the invention.

DETAILED DESCRIPTION OF THE PREFERRED EMBODIMENTS

Figure 4:
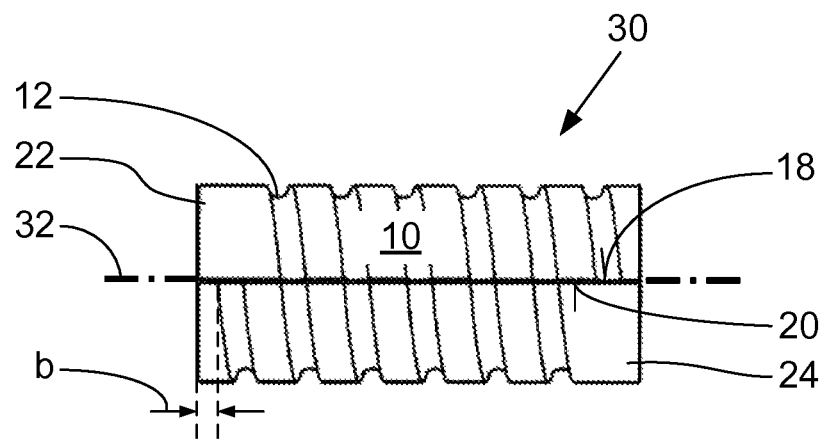

FIGS. 1 to 6 show, accordingly, the illustration of the sequence of the first method variant for producing a first embodiment of a spindle for a ball screw. A flat, rectangular material section 10 is cut from a not-shown, endless web-shaped semifinished product during a first processing step. The material section 10 shown in cross section in FIG. 1 is preferably a rectangular sheet metal section 10 with low material thickness. In the next processing step, as shown in the cross-sectional illustration of FIG. 2, a thread profile 12 is formed in the material section 10. The thread profile 12 is preferably produced as a round thread 14 in which not shown ball-shaped roller bodies of a similarly not-shown ball screw can roll with low friction. The formation of the thread profile 12 can be realized by any method known from the prior art, for example, thread pressing. Deviating from the method sequence explained above, it is also possible to form the thread profile 12 continuously in the web-shaped semifinished product and then to cut the material section.

The thread profile 12 is here formed so that after rolling the initially flat material section 10, at least one continuous thread turn 16 is produced for holding the roller bodies. The thread profile 12 extends as shown in the top view according to FIG. 3 on the material section 10 up to parallel longitudinal edges 18, 20 or to narrow sides of the material section 10, while both axial end sections 22, 24 have profile-free constructions. The axial end sections 22, 24 are reflection symmetrical relative to each other and each have approximately the shape of a right triangle.

As shown in FIG. 4, in a subsequent processing step, the profiled material section 10 is shaped with the help of a suitable shaping process into a hollow cylindrical sleeve 30, wherein the thread profile 12 is arranged radially outward with respect to a longitudinal center axis 32 of the hollow cylindrical sleeve 30. The two longitudinal edges 18, 20 of the material section 10 are formed by this shaping process ideally to realize a completely abutting contact. In addition, the axial end sections 22, 24 without thread profile after the completion of the shaping process can be seen in FIG. 4.

Figure 5:
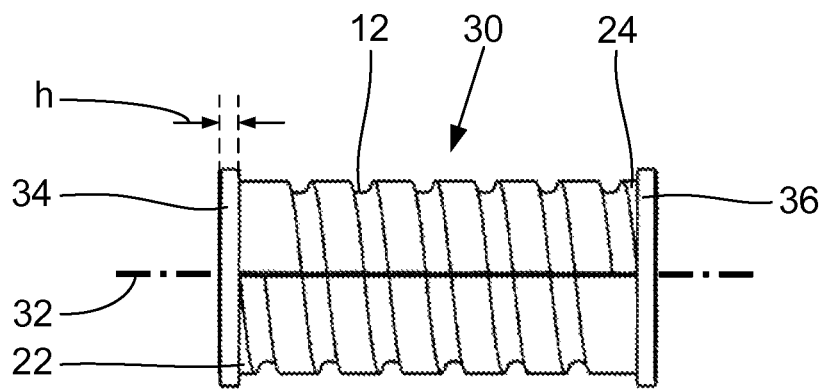

In a subsequent processing step, as shown in FIG. 5, a hollow cylindrical ring 34, 36 is pressed onto an axial end section 22, 24. Through the two rings 34, 36, the longitudinal edges 18, 20 are connected mechanically rigidly to each other at least in the area of the axial end sections 22, 24. In this way, the creation of a technically demanding weld seam or solder seam is not required for joining the two longitudinal edges 18, 20. Before or after the pressing of the two rings 34, 36, the hollow cylindrical sleeve 30 can be subjected to a hardening process with its radially outer thread profile 12. An inner diameter of the rings 34, 36 is to be dimensioned with respect to the outer diameter of the axial end sections 22, 24 of the hollow cylindrical sleeve 30 so that an at least slight press-fit connection is realized between these parts. A width b of the axial end sections 22, 24 without profile is preferably equal to or greater than a width h of the rings 34, 36.

Figure 6:
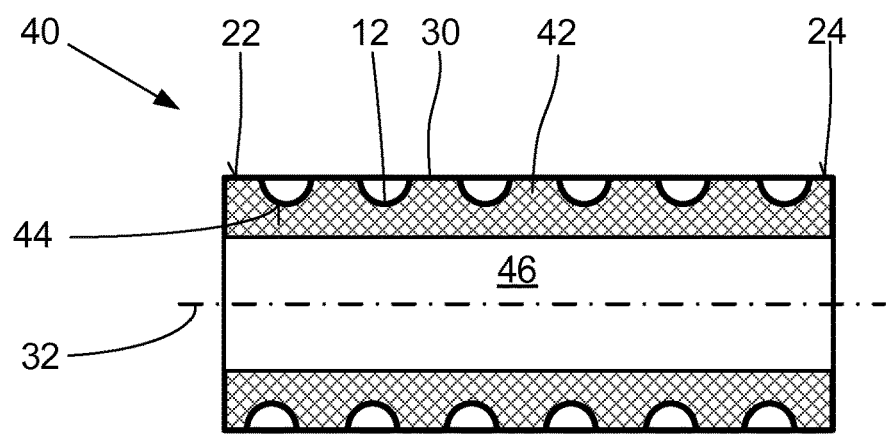

As FIG. 6 shows, the hollow cylindrical sleeve 30 is provided radially on the inside with a support structure 42, wherein a spindle 40 for a ball screw with the features of the invention is created. For the sake of better clarity in the drawing, the two rings 34, 36 are not shown in FIG. 6.

The support structure 42 is here formed, as an example, concentric to the hollow cylindrical sleeve 30 and to the longitudinal center axis 32. It is formed, for example, from a fiber-reinforced plastic that further increases the mechanical load capacity of the spindle 40. By use of the support structure 42, a spindle 40 is created in a hybrid construction in which the metallic sleeve 30 receives and simultaneously distributes, with its thread profile 12, the surface pressures through the point contact with ball-shaped roller bodies, while the support structure 42 provides the necessary stiffness for the spindle 40. Just the plastic of the support structure 42 would not be sufficient to continuously receive the surface pressures of the rolling balls. Thus, a mechanically high load capacity and consequently expensive sheet metal or metallic material is required only for the hollow cylindrical sleeve 30 with the thread profile 12 formed in this sleeve, while the support structure can be formed from a relatively economical plastic as a filler material.

The formation of the support structure 42 can be realized, for example, by injection molding, wherein a not-shown cylindrical core of an injection molding tool is introduced axially into the hollow cylindrical sleeve 30 and also the hollow cylindrical cavity between the core and the sleeve 30 is filled for creating the support structure 42 with the material of the support structure 12. Injecting the plastic produces a mechanically especially close-fitting, thus positive-locking and material-bonding connection between the shaped support structure 42 and a corrugated inner surface 44 of the hollow cylindrical sleeve 30 as a negative image of the thread profile 12. Therefore, in addition to the two rings 34, 36, an additional connection between the abutting longitudinal edges 18, 20 of the hollow cylindrical sleeve 30 is created, so that easy and smooth running of the ball screw equipped with the spindle 40 is achieved.

Deviating from the embodiment of spindle 40 shown in FIG. 6, the inner space 46 of the hollow cylindrical sleeve 30 can also be completely filled with plastic if the weight of the spindle is of lower significance.

Figure 7:
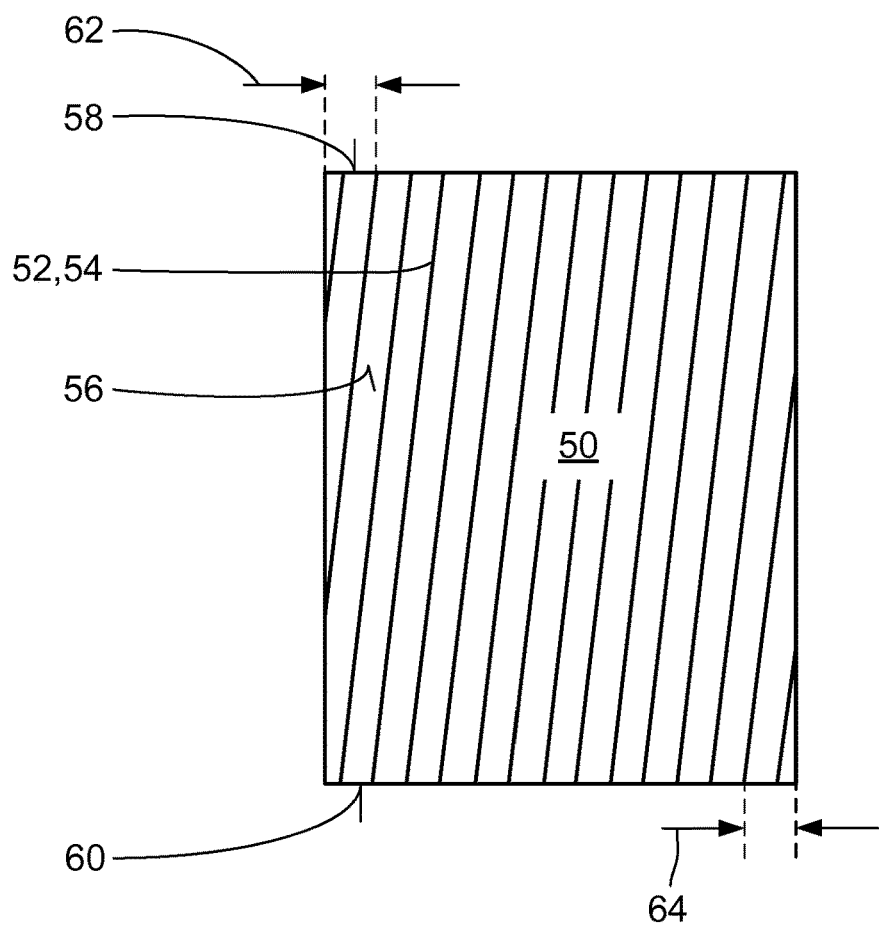
Figure 8:
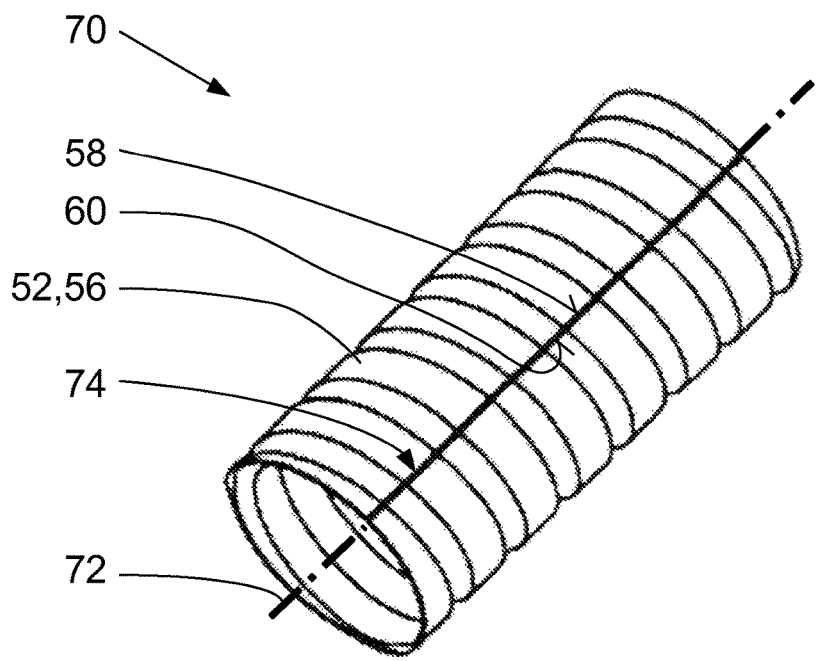
Figure 9:
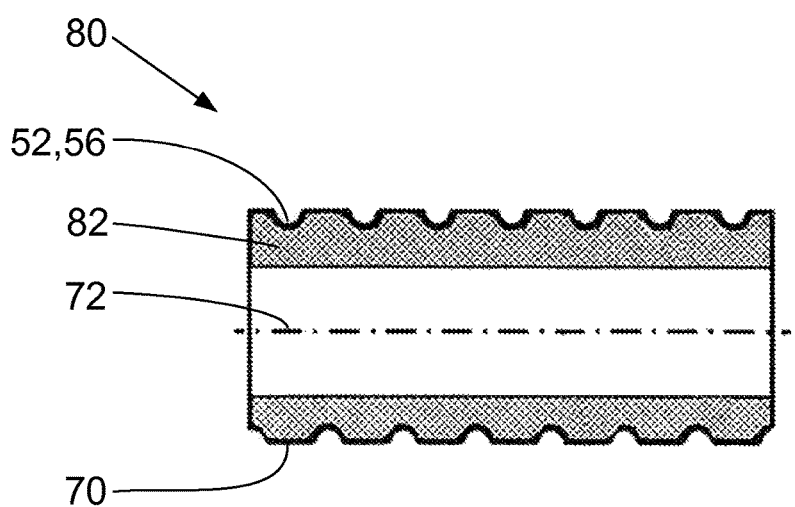

FIGS. 7 to 9 show in a simplified illustration a second method variant for producing a second embodiment of a spindle for a ball screw. In an initially flat material section 50, in a first processing step, a thread profile 52 is formed, in turn, which is preferably constructed as a round thread 54 for ball-shaped roller bodies and has at least one thread turn 56 for guiding the rolling roller bodies.

The thread profile 52 extends between two parallel longitudinal edges 58, 60 of the material section 50. In contrast to the first method variant according to FIGS. 1 to 6, the thread profile 52 extends, however, into the area of the two axial end sections 62, 64. With respect to the other construction of the material section 50, in order to avoid repetition, refer to the explanations with regard to FIGS. 1 to 3.

As can be seen from the perspective view of FIG. 8, the initially flat material section 50 is shaped by the use of a suitable shaping process, in turn, into a hollow cylindrical sleeve 70, wherein the thread profile 52 is arranged radially outward with the helical surrounding thread turn 56 with respect of a longitudinal center axis 72 of the sleeve 70 and the two longitudinal edges 58, 60 of the material section 50 abut each other over their entire surface.

As another difference to the first method variant, the two longitudinal edges 58, 60 are mechanically rigidly joined in another, preferably thermal processing step, for example, by laser welding or soldering, continuously under the creation of a longitudinal seam 74. Alternatively, the connection of the two longitudinal edges 58, 60 can also be realized by adhesive bonding, swaging, pressing, or the like. After the connection of the two longitudinal edges 58, 60 by preferably thermal joining, a surface treatment of the longitudinal seam 74 by grinding, polishing, or honing can be performed, in order to further optimize the running behavior of the ball screw. The hollow cylindrical sleeve 70 with the thread profile 52 formed in this sleeve is preferably subjected to a hardness treatment, in order to increase its wear resistance.

As the longitudinal section according to FIG. 9 shows, in a final processing step, the completion of the second embodiment of a spindle 80 for a ball screw is realized, in turn, by forming a support structure 82 that is preferably formed from an optional, additional fiber-reinforced plastic. With respect to further structural details of the support structure 82 and its production, refer to the statements in the scope of the description of FIG. 6.

In contrast to the first method variant, in the case of the second method variant, it is possible with preferably welded longitudinal seams to produce the spindle 80 as one continuous section of nearly arbitrary length. For this purpose, the thread profile 52 is formed initially continuously in the endless web-shaped, initially flat semifinished product, from this the hollow cylindrical sleeve 70 is formed continuously by a shaping process, and finally its longitudinal edges 58, 60 are welded to each other continuously at least in some sections. In parallel, the plastic for forming the support structure 82 is fed continuously into the already welded hollow cylindrical sleeve 70 by an injection welding tool. Finally, a section completed in this way can be cut to length into spindles 80 with a nearly arbitrary length.

REFERENCE NUMBERS

10 Flat material section
12 Threaded profile, external thread
14 Round thread
16 Thread turn
18 Longitudinal edge of the material section 10
20 Longitudinal edge of the material section 10
22 Axial end section of the material section 10
24 Axial end section of the material section 10
30 Hollow cylindrical sleeve
32 Longitudinal center axis of the sleeve 30
34 First ring
36 Second ring
40 Spindle
42 Support structure
44 Inner surface of the support structure
46 Inner space
50 Flat material section 52 Threaded profile, external thread
54 Round thread
56 Thread turn
58 Longitudinal edge of the material section 50
60 Longitudinal edge of the material section 50
62 Axial end section of the material section 50
64 Axial end section of the material section 50
70 Hollow cylindrical sleeve
72 Longitudinal center axis of the sleeve 70
74 Longitudinal seam
80 Spindle
82 Support structure
h Width of the rings 34, 36
b Width of the profile-free end sections 22, 24

The invention claimed is:

1. A method for producing a spindle for a ball screw, the method comprising:
   forming a thread profile in a flat material section at least in some areas,
   shaping the flat material section into a hollow cylindrical sleeve, wherein two longitudinal edges of the hollow cylindrical sleeve abut each other and the thread profile is directed radially outward,
   connecting the two longitudinal edges of the hollow cylindrical sleeve at each of two axial end sections of the hollow cylindrical sleeve and spaced away from the thread profile, and
   forming a support structure on a radial inner side of the hollow cylindrical sleeve at least in some areas.

2. The method according to claim 1, wherein the flat material section is a sheet metal section with a small material thickness that is separated from a web of sheet metal semifinished product.

3. The method according to claim 1, wherein the thread profile is formed as a round thread with at least one thread turn for holding spherical roller bodies of a ball screw.

4. The method according to claim 1, wherein the connection of the two longitudinal edges of the hollow cylindrical sleeve is realized by joining at least in one section by creation of a longitudinal seam.

5. The method according to claim 4, wherein the longitudinal seam is subjected to a surface treatment, including at least one grinding, polishing, or honing.

6. A method for producing a spindle for a ball screw, the method comprising:
   forming a thread profile in a flat material section at least in some areas,
   shaping the flat material section into a hollow cylindrical sleeve, wherein two longitudinal edges of the hollow cylindrical sleeve abut each other and the thread profile is directed radially outward,
   connecting the two longitudinal edges of the hollow cylindrical sleeve, and
   forming a support structure on a radial inner side of the hollow cylindrical sleeve at least in some areas,
   wherein the connection of the two longitudinal edges of the hollow cylindrical sleeve is realized by pressing a ring onto each of two axial end sections of the hollow cylindrical sleeve.

7. The method according to claim 6, wherein the hollow cylindrical sleeve is produced such that the axial end sections have a non-profiled construction.

8. The method according to claim 1, further comprising constructing the support structure by injection molding with a plastic material.

9. The method according to claim 8, wherein the support structure has a circular ring-shaped cross-sectional geometry that is formed concentric to the hollow cylindrical sleeve.

10. A spindle for a ball screw produced according to claim 1, wherein the spindle includes the hollow cylindrical sleeve with the radially outer thread profile and the support structure formed on a radial inner side of the hollow cylindrical sleeve.

11. The method according to claim 6, wherein the flat material section is a sheet metal section with a small material thickness that is separated from a web of sheet metal semifinished product.

12. The method according to claim 6, wherein the thread profile is formed as a round thread with at least one thread turn for holding spherical roller bodies of a ball screw.

13. The method according to claim 6, wherein the connection of the two longitudinal edges of the hollow cylindrical sleeve is realized by joining at least in one section by creation of a longitudinal seam.

14. The method according to claim 13, wherein the longitudinal seam is subjected to a surface treatment, including at least one grinding, polishing, or honing.

15. The method according to claim 6, further comprising constructing the support structure by injection molding with a plastic material.

16. The method according to claim 15, wherein the support structure has a circular ring-shaped cross-sectional geometry that is formed concentric to the hollow cylindrical sleeve.

17. A spindle for a ball screw produced according to claim 6, wherein the spindle includes the hollow cylindrical sleeve with the radially outer thread profile and the support structure formed on a radial inner side of the hollow cylindrical sleeve.

18. The method according to claim 1, wherein a connection between the two longitudinal edges of the hollow cylindrical sleeve is formed without a weld seam.

* * * * *